United States Patent
Kanamoto et al.

(10) Patent No.: US 6,207,091 B1
(45) Date of Patent: *Mar. 27, 2001

(54) PROCESS FOR PRODUCING THE DRAWN MOLDED ARTICLE OF A FLUOROPLASTIC

(75) Inventors: Tetsuo Kanamoto, Saitama-ken; Ryoukei Endo, Chiba-ken; Hiroki Uehara, Gunma-ken, all of (JP)

(73) Assignee: Nippon Mitsubishi Oil Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,948

(22) Filed: May 4, 1998

(30) Foreign Application Priority Data

May 23, 1997 (JP) .................................................. 9-148500

(51) Int. Cl.⁷ ............................. B29C 55/00; B29C 47/88
(52) U.S. Cl. .................................. 264/173.11; 264/210.7; 264/177.19; 264/288.4; 264/292; 264/331.14; 264/173.13; 264/165
(58) Field of Search .............................. 264/210.7, 210.1, 264/210.8, 164, 177.19, 288.4, 290.5, 290.7, 291, 292, 331.14, 173.11, 173.13, 165

(56) References Cited

U.S. PATENT DOCUMENTS

| | | | |
|---|---|---|---|
| 2,776,465 | * | 1/1957 | Smith . |
| 4,820,787 | * | 4/1989 | Kataoka et al. ..................... 526/255 |
| 4,824,898 | * | 4/1989 | Sukigara et al. ..................... 524/401 |
| 4,853,164 | * | 8/1989 | Kiang et al. ............................ 264/22 |
| 4,938,913 | * | 7/1990 | Ward et al. ........................... 264/570 |
| 5,098,625 | * | 3/1992 | Huang et al. ......................... 264/127 |
| 5,167,890 | * | 12/1992 | Sasshofer et al. .................... 264/127 |
| 5,433,909 | * | 7/1995 | Martakos et al. .................. 264/209.1 |
| 5,474,727 | * | 12/1995 | Perez ..................................... 264/154 |
| 5,562,987 | * | 10/1996 | Shimizu ................................ 428/364 |
| 5,686,033 | * | 11/1997 | Shimizu ................................ 264/127 |
| 5,772,884 | * | 6/1998 | Tanaka et al. .................. 210/500.36 |
| 5,804,290 | * | 9/1998 | Marini et al. ......................... 428/220 |

FOREIGN PATENT DOCUMENTS

| | | |
|---|---|---|
| 1-192812 | 8/1989 | (JP) . |
| 2--307907 | 12/1990 | (JP) . |
| 5-078908 | 3/1993 | (JP) . |
| 8-132521 | 5/1996 | (JP) . |

OTHER PUBLICATIONS

Howard W. Starkweather, Jr., A Comparison Of The Rheological Properties Of Polytetrafluoroethylene below Its Melting Point With Certain Low–Molecular Smectic States*, *Journal of Polymer Science: Polymer Physics Edition*. vol. 17, (1979) pp. 73–79.

Robert L. McGee and John R. Collier, Solid State Extrusion Of Polytetrafluoroethylene Fibers, *Polymer Engineering And Science*, (Mid–Feb.), 1986, vol. 26, No. 3, pp. 239–242.

* cited by examiner

*Primary Examiner*—Jan H. Silbaugh
*Assistant Examiner*—Mark Eashoo
(74) *Attorney, Agent, or Firm*—Akin, Gump, Strauss, Hauer & Feld, L.L.P.

(57) ABSTRACT

A process for producing a fluoroplastic drawn molded article is disclosed in which a fluoroplastic molded article is brought into contact with a heating medium set at a temperature exceeding the static melting point of the molded article and drawn at a temperature at which the molded article does not substantially melt. The fluoroplastic drawn molded article produced in accordance with the present invention is significantlly improved in physical properties such as tensile strength and tensile modulus.

9 Claims, No Drawings

PROCESS FOR PRODUCING THE DRAWN MOLDED ARTICLE OF A FLUOROPLASTIC

BACKGROUND OF THE INVENTION

1. Field of the Invention

This invention relates to processes for producing the drawn molded article of a fluoroplastic (a fluorine-contained resin), more particularly to a process for producing a drawn molded article of a fluoroplastic which is significantly improved in mechanical properties such as strength, tensile modulus and the like by drawing a fluoroplastic under the specified conditions.

2. Prior Art

Fluoroplastics have been widely used as engineering plastics because their remarkably high melting point, excellent resistance to chemicals and low friction coefficient of the surfaces. Since a fluoroplastic resembles in chemical structure closely a polyolefin, it has been attempted to produce a drawn article in the form of a film, tape and yarn of high strength and tensile modulus by stretching the molecular chains having been changed to be uniaxially oriented and highly crystallized morphology. Japanese Laid-Open Patent Publication Nos. 1-192812, 2-307907 and 5-78908 disclose the process of producing a fluoroplastic fiber by applying a technique of drawing polyethylene or polypropylene. One of these prior techniques involves a complicated processes in which after dissolving a fluoroplastic which is not dissolved with a general-purpose solvent, with a special solvent thereby obtaining the solution, the fluoroplastic is drawn by spinning, followed by extracting the solvent. In another technique, a fluoroplastic solution is melted by heating at a temperature higher than the melting point thereof and the resulting high viscosity melt is drawn by spinning. However, it is very difficult in technical view to spin the solution and the melt uniformly and since particularly the latter method is effected at a high temperature above the melting point, there are anxieties of the occurrence of gases which thermally decomposes the fluoroplastic and is harmful for a human body. Therefore, the fact is that the above-mentioned two methods are inadequate for practical use. Other than these prior methods, there are another methods of extruding polytetrafluoroethylene in the solid state as disclosed in J. Polym. Sci. Polym. Phys. Ed., 17 (1979) 73 and Polym. Eng. Sci., 26 (1986) 239. However, these methods fail to improve the strength of the drawn article to an extent that would be satisfactory.

Furthermore, although it is disclosed in Japanese Laid-Open Patent Publication No. 8-132521 that a drawn article is obtained by tensile stretching an article derived from solid-state extrusion, this method has been demanded to be further improved.

Generally speaking, a drawn article can be improved in strength and tensile modulus with respect to the drawing direction by using a starting fluoroplastic having a larger molecular weight if starting fluoroplastics are intended to be drawn at the same draw ratio or by increasing the draw ratio if starting fluoroplastics are the same in molecular weight. However, in the already mentioned methods the use of a starting fluoroplastic excessively increased in molecular weight leads to a reduction in solubility in a solvent or an increase in viscosity when melted, resulting in not only an inconvenience that spinning or drawing operation is hindered but also a risk that the breakage caused by drawing occurs frequently.

It has been found that there can be produced a drawn molded article of a fluoroplastic excelled in mechanical properties such as strength and tensile modulus by drawing in a specified manner.

SUMMARY OF THE INVENTION

According to the present invention, there is provided with a process for producing a drawn molded article of a fluoroplastic wherein a fluoroplastic molded article is brought into contact with a heating medium set at a temperature exceeding the static melting point of the molded article and drawn at a temperature at which the molded article does not substantially melt. The inventive process is characterized by the use of the heat medium in the form of a stretch pin. Furthermore, the inventive process is characterized in that the fluoroplastic molded article is obtained by solid-state extruding or solid-state rolling a fluoroplastic at temperatures within which the fluoroplastic does not substantially melt.

DETAILED DESCRIPTION OF THE INVENTION

The process according to the present invention is intended to produce a drawn molded article by drawing the molded article of a fluoroplastic in a specified manner.

Fluoroplastic used as a starting material may be any type of fluoroplastic inclusive of a copolymer. Eligible fluoroplastic exemplarily includes polytetrafluoroethylene (PTFE), polychlorotrifluoroethylene (PCTFE), tetrafluoroethylene-perfluoroalkylvinylether copolymer (PFA), tetrafluoroethylene-ethylene copolymer (ETFE), tetrafluoroethylene-hexafluoropropylene copolymer (FEP), chlorotrifluoroethylene-ethylene copolymer (ECTFE), tetrafluoroethylene-hexafluoropropylene-perfluoroalkylvinylether copolymer (EPE), polyvinylidenefluoride (PVDF) and polyvinylfluoride (PVF), among which polyvinylidenefluoride is particularly preferred because it can be highly crystallized by drawing. A copolymer used as a starting fluoroplastic is not particularly restricted to its ratio of comonomers and may be those derived from alternating copolymerization, random copolymerization or block copolymerization. Copolymerization may be preferably done by a two or more-stage reaction. Such multi-stage copolymerization may be effected by repeating only homopolymerization under the condition of different molecular weight or by conducting homopolymerization and copolymerization in combination.

Bonding between monomers including comonomers may be head-to-head, head-to-tail or tail-to-tail bond. The above mentioned fluoroplastics may be used singularly or in combination. The combination of more than two fluoroplastics is not restricted to the blend ratio of each fluoroplastics as long as the accomplishment of the present invention is not bothered.

No particular restrictions are imposed upon the molecular weight of the starting fluoroplastic. However, fluoroplastics of too low molecular weight would result in difficulty in producing a drawn article increased in tensile strength because they cannot be drawn by tensile stretching at a higher drawn ratio, while those of too high molecular weight would result in difficulty in increasing a deformation ratio by extrusion or rolling because of their too long molecular chains. Therefore, a fluoroplastics suitable for the invention have a molecular weight in the range of preferably $5.0 \times 10^3$ to $5.0 \times 10^9$, more preferably $5.0 \times 10^4$ to $5.0 \times 10^8$ and further preferably $5.0 \times 10^5$ to $1.0 \times 10^8$. The method of measuring the molecular weight of a fluoroplastic has been reported in a variety of documents. For instance, the molecular weight of polytetrafluoroethylene can be measured by estimating from a relaxation time in the molten state as reported in Polymer Engineering Science 28, 538 (1988) or from the light scattering of the solution as reported in Macromol 22, 831 (1989). The molecular weight of tetrafluoroethylene-hexafluoropropylene copolymer can be measured by estimating from a relaxation time in the melted state as taught in Macromol., 18, 2023 (1985) while that of tetrafluoroethylene-ethylene copolymer can be measured by estimating from the condition of light scattering of the solution as taught in Macromol., 20, 98 (1987). The molecular weight of other fluoroplastics can be measured by applying the method of estimating from a relaxation time in the molten state as taught in Polymer Engineering Science 25, 122 (1985). The molecular weight distribution of a fluoroplastic can be derived from the measurement of molecular weight in accordance with the foregoing method. A fluoroplastic to be used in the present invention will preferably be narrow in molecular weight distribution to obtain a drawn article excelled in mechanical properties.

No limitations are imposed upon the method of producing a starting fluoroplastic used in the invention. Therefore, there may be employed any polymerization method such as suspension polymerization, emulsion polymerization, bulk polymerization, solution polymerization or gas phase polymerization. Furthermore, no limitations are imposed upon a polymerization catalyst and a cocatalyst to be used for these polymerization methods and the conditions of polymerization such as temperature, pressure and time. If a polymerization requires a solvent, there may be used any type of solvent.

Although in the present invention there may be used a powdery or granular fluoroplastic which is derived from removing the solvent after polymerization, it may be cooled after being melted or dissolved in any suitable solvent, followed by removal of the solvent prior to be used. However, the fluoroplastic having been subjected to such a pretreatment must satisfy the following requisites. Namely, a powdery or granular fluoroplastic is weighed 1 mg before and after being pretreated and then the melting endothermic curve of each of the 1 mg pretreated fluoroplastic and the 1 mg unpretreated fluoroplastic is measured under the condition that heating rate is 10° C./minute using a differential scanning calorimeter. When the temperature indicated by the highest peak of the melting endothermic curve is defined as a peak temperature, i.e. static melting point, preferred powdery or granular fluoroplastics are those having the peak temperatures before and after being pre-treated which satisfy the relationship indicated by the following equation:

[the peak temperature of the pretreated fluoroplastic (° C.)> the peak temperature of the fluoroplastic prior to be pretreated −4° C.]

and more preferably satisfying the following equation:

[the peak temperature of the pretreated fluoroplastic (° C.)> the peak temperature of the fluoroplastic prior to be pretreated −2° C.].

The fluoroplastic used as a starting material in the present invention has a particle diameter in the range of 0.1 to 1,000 μm, preferably 1 to 500 μm. The fluoroplastic may be blended with any suitable additives including a strengthening additive such as milled carbon fiber, an ultraviolet absorber, an anti-degradation agent, a light-resistance agent, an anti-oxidant, a pigment and a dye to an extent that the achievement of the invention is not bothered. These additives are selected from those which do not act as a lubricant or solvent for the fluoroplastic.

Although no limitations are imposed upon the method of molding the above-mentioned starting fluoroplastic, the molding method is preferably done by extruding or rolling (generally referred to as solid-state molding process) the fluoroplastic in the solid state at a temperature not exceeding the melting point thereof. Alternatively, prior to the solid-state molding process the fluoroplastic may be subjected to pre-compression molding. This pre-compression molding process should be done at a temperature at which the fluoroplastic does not substantially melt.

The upper limit of the temperature at which the fluoroplastic does not substantially melt is varied depending upon the nature thereof or the molding method, i.e. whether it is compression molding, solid-state extrusion or solid-state rolling or stretching which will be described hereinafter in detail. Firstly, the term "temperature substantially at which the fluoroplastic is not melted" used herein is defined as follows.

When having the endothermic melting curve of a fluoroplastic drawn by a differential scanning calorimeter, the peak melting point, i.e. the peak top temperature of the maximum peak temperature (static melting point) can be derived from the curve. The same kind of fluoroplastics are different in peak melting point from one another depending upon whether they are subjected to the molding process or not. Moreover, the peak melting point of a fluoroplastic prior to be molded is different from that of the fluoroplastic after being molded. The inventors of the present invention has obtained the following knowledge regarding the difference in the peak melting point between a fluoroplastic prior to be molded and the fluoroplastic after being molded.

A fluoroplastic subjected to compression molding, solid-state extrusion or rolling or drawing is higher or lower in the peak melting point than in that before being subjected to the molding process. A desired molded article can be obtained at any time in the case where the maximum endothermic temperature of a fluoroplastic subjected to compression molding, solid-state extrusion or rolling or drawing at an arbitrary temperature is higher than that of the fluoroplastic prior to being subjected to the molded process. Moreover, a desired molded article can also be obtained if the peak melting point of a fluoroplastic after being molded is lower than that of the fluoroplastic before being molded but the difference therebetween is within 4° C., preferably 2° C. Therefore, according to the invention the molding of a fluoroplastic can be taken to be effected at a temperature at which it does not substantially melt, if the difference in the peak melting point between a sample after being molded at a temperature (t° C.) and the sample before being molded meets the condition defined by the following equation:

$$P(t) > P0 - 4° C., \text{ preferably } P(t) > P0 - 2° C. \qquad (I)$$

wherein P(t) is the peak melting point (° C.) of each of samples subjected to the molding process such as compression molding, solid-state extrusion or rolling or drawing at a temperature (t° C.) and P0 is the peak melting point (° C.) of each of the samples prior to being molded. The endothermic melting curve of the sample of a fluoroplastic which was weighed 1 mg was obtained by using a differential scanning calorimeter under the conditions that heating rate was 10° C./minute.

Furthermore, the upper limit temperature of each of the molding processes satisfying the formula (I) can be obtained by conducting the above-described measurement of the peak melting point using a sample of any one of the eligible fluoroplastics as a starting material for the present invention at every molding processes of compression-molding and solid-state extrusion or solid-state rolling at the varied temperatures. It is also possible for the other starting fluoroplastics to derive the upper limit of molding temperature satisfying the above formula (I) by taking the same procedure. In the present invention, the upper limit of molding temperature of each of the starting fluoroplastics derived upon each of the molding processes is the upper limit of temperature at which the fluoroplastic does not substantially melt and hereinafter referred to as "upper limit molding temperature". According to the invention, it is only the requirement that compression molding, solid-state extrusion or solid-state rolling or drawing should be effected at a temperature below the upper limit of the molding temperature. As long as this requirement is satisfied, the compression molding, or solid-state extrusion or solid-state rolling may be done at any temperature. However, as to drawing, there is another requirement in the temperature of a heat medium hereinafter described. The lower limit of the molding temperature is usually room temperature, preferably temperature 150° C. lower than the upper limit of the molding temperature, more preferably 100° C.

There will now be described the compression molding and solid-state extrusion and rolling, respectively. Although a starting fluoroplastic may be subjected to solid-state extrusion or solid-state rolling as it is, prior to this molding process it is preferably subjected to compression molding. There may be used any type of compression molding device. The fluoroplastic after being compression-molded may be in the form of a rod or a sheet (film). The fluoroplastic in the form of a sheet (film) is 0.1 to 5 mm in thickness. This optional pre-compression molding is carried out at the above-described temperature at which the fluoroplastic does not substantially melt, generally at a temperature below the upper limit of the molding temperature and above room temperature. Polytetrafluoroethylene is compression-molded at a temperature in the range of room temperature to 335° C., preferably 200–330° C. No limitations are imposed upon the pressure at which the compression molding is done, but it is selected from the range of generally 10 MPa to 2 GPa, preferably 20 MPa to 500 MPa.

The starting fluoroplastic may be supplied directly or through the pre-compression molding process to the solid-state extrusion or solid-state rolling process. The solid-state extrusion according to the invention encompasses not only a usual extrusion in which a fluoroplastic is extruded solely but also a co-extrusion in which a fluoroplastic is extruded together with other plastics. Either of these extrusion methods is not restricted to the way to be carried out. For instance, a starting fluoroplastic or the compression molded article thereof is fed into the cylinder fixed at the end with a die and provided in a solid-state extrusion device and extruded in accordance with a conventional manner. Alternatively, in the case of employing the co-extrusion method, a fluoroplastic compression-molded in the form of a sheet in advance is extruded by nipping between sheets or billets made from a different kind of plastic. In this case, eligible plastics for the sheets or billets are polyolefin such as polyethylene, polypropylene, poly 4-methyl-1-pentene and another fluoroplastics. The die may be selective in shape from a circle, ellipse, rectangle or other suitable shapes. Generally, there is used a die having the inlet which is larger in sectional area than the outlet. No particular limitations are imposed upon the size of a die which, however, is selected within the range of 5–100 mm, preferably 5–50 mm. Pressure upon extrusion is suitably varied depending upon the magnitude of deformation ratio by extrusion. With the consideration given to an extrusion ratio, the acceptable ranges of the pressure are generally 0.1 MPa to 300 MPa, preferably 1 MPa to 100 MPa. The extrusion ratio is selected correspondingly with the production method of a starting fluoroplastic, the particle size, particle size distribution, molecular weight and molecular weight distribution thereof and the size and shape of a die. Generally speaking, the lower limit of extrusion ratio is twofold, preferably fivefold, while the upper limit is not particularly limited, but generally 100-fold, preferably 60-fold because too large extrusion ratio requires a large extrusion pressure. Extrusion temperature is lower than the above-described temperature at which the starting fluoroplastic does not substantially melt. More specifically, the solid-state extrusion is conducted at a temperature below the above-mentioned upper limit molding temperature and above the lower limit molding temperature. In the case of using polytetrafluoroethylene, the solid-state extrusion is conducted at a temperature in the range of room temperature to 335° C., preferably 200 to 330° C. Solid-state extrusion effected at a temperature above the upper limit molding temperature would lead to a problem in the drawability of the starting fluoroplastic and the maximum ultimate draw ratio upon the following tensile stretch process, resulting in that the purpose of the invention cannot be achieved. The solid-state extrusion effected at a temperature below the lower limit molding temperature would lead to a problem in the maximum ultimate draw ratio upon the stretch drawing process and the physical properties of the resulting drawn article, resulting in also that the object of the invention cannot be achieved. Upon solid-state extrusion according to the invention, there may be preferably used an extrusion method in which an object to be extruded is pre-pressurized and then extruded. The object should be pre-pressurized at 10 MPa to 100 MPa. Extrusion speed is selected from the range of 1 mm/minute to 1 m/minute, preferably 10 mm/minute to 500 mm/minute. Although the shape of the extruded fluoroplastic is determined by the shape of a die or the method of co-extrusion, the sectional shape is in the form of circle, ellipse or rectangular.

Usually, a fluoroplastic having been compression-molded in the shape of a rod or a sheet is supplied to the solid-state rolling process according to the invention. There is usually employed a solid-state rolling method which is conducted by nipping a fluoroplastic compression-molded in the shape of a rod or a sheet between a pair of rollers which rotate at the same or a different speed. The deformation ratio by the rolling operation can be chosen from a variety of range. If the deformation ratio is expressed by rolling efficiency (the length of a fluoroplastic after being rolled/the length of the same prior to be molded), the lower limit thereof is usually 1.2-fold, preferably 1.5-fold. However, the solid-state rolling can be generally done at a rolling efficiency of 30-fold, preferably 20-fold. The solid-state rolling is effected at a temperature below the above-mentioned temperature at which a fluoroplastic does not substantially melt, more specifically at a temperature below the upper limit molding temperature and above the lower limit molding temperature. In the case of subjecting polytetrafluoroethylene to the solid-state rolling, rolling temperatures are set within the range of room temperature to 335° C., preferably 200 to 330° C. Solid-state rolling effected at the temperature exceeding the upper limit molding temperature would lead to a problem in the drawability of a fluoroplastic and the maximum ultimate draw ratio upon the following tensile stretch process, resulting in that the object of the invention cannot be achieved. Solid-state rolling effected at a temperature below the lower limit molding temperature would lead to a problem in the maximum ultimate draw ratio upon the following tensile stretch process and the physical properties of the resulting drawn article, resulting in also that the object of the invention cannot be achieved. The rolling speed may be suitably selected from the range between 0.5 and 100 m/minute, preferably 1 and 50 m/minute. The shape of the rolled fluoroplastic may be in the form of a tape, a film or a sheet and have a cross-section in the shape of an ellipse or a rectangle. Needless to mention, the solid-state rolling may be done by a two or more-stage.

In the drawing process according to the invention, a fluoroplastic is preferably supplied after being subjected to the above-mentioned solid-state extrusion or rolling. Although the drawn article is not particularly limited to its shape, it is preferably shaped into a tape, a film or a sheet. As described above, the drawing in the inventive process is characterized by being effected at a temperature at which an object to be drawn does not substantially melt after it is brought into a contact with a heat medium heated at a temperature exceeding the static melting point of the molded fluoroplastic. The term "static melting point" used herein designates a temperature indicated by the peak melting point of the endothermic melting curve of the molded fluoroplastic weighed to be 1 mg, which curve was drawn under the condition that heating rate is 10° C. using a differential scanning calorimeter. The term "a temperature at which an object to be stretched does not substantially melt" used herein is the same in meaning as the term "a temperature at which a fluoroplastic does not substantially melt" upon the above-mentioned solid-state molding.

The drawing according to the invention must be effected with the foregoing requisites being satisfied but further desirously fulfills the requirement that an object to be drawn is heated for a short period of time and stretched for the short period time.

Now, there will be described the difference between the drawing conducted with the use of a heat medium according to the present invention and a conventional tensile stretching. The drawing according to the invention is characterized in that a sample to be drawn is heated only at the moment it is brought into contact with a heat medium and is drawn simultaneously. Therefore, the temperature of the sample free from being contacted with the heat medium is equal to room temperature. On the other hand, in a conventional tensile stretching a sample is heated over a certain length and then stretched at the same time as the sample entirely reaches to a temperature at which it becomes stretchable. Therefore, the drawing according to the present invention is apparently different from a conventional stretching.

The drawing according to the invention is necessarily conducted using a heat medium of which surface is heated to a temperature above the static melting point of an object to be drawn. The upper limit of the surface temperature of the heat medium is usually less than 100° C., preferably less than 70° C. above the static melting point of an object to be drawn. Since the static melting point is varied with a kind and combination of fluoroplastics and the conditions of the preceding molding, the specific range of the surface temperature of the heat medium cannot be defined but is above 336° C. and below 436° C., preferably 406° C. if using polytetrafluoroethylene.

The drawing process according to the invention is generally done by tensile stretching. This stretching may be carried out by using a conventional tensile machine such as Strograph R manufactured by Toyo Seiki Manufacturing Co., Ltd. having a crosshead fixed with a heat medium such as one referred to as stretch pin which is capable of increasing the temperature of a sample for a short period of time and movable over the sample correspondingly with the movement of the crosshead thereby drawing the sample from edge to edge. Alternatively, there may be used a stretching method where rollers for feeding an object to be drawn and taking up an object having been drawn are disposed to be movable back and forth with respect to a heat medium preferably such as a stretch pin which is capable of increasing a temperature of a sample for a short period of time and fixed on a separate structure so that the heat medium can draw the object to be drawn by consecutively contacting therewith thereby obtaining an elongated drawn article.

Eligible heat mediums used herein are those in the shape of a cylinder, a prism or a sheet which can be controlled at a certain temperature. The heat medium can be heated by any suitable means such as steam, an electric heater or a dielectric heater.

The heat medium used in the inventive process is preferably a cylindrical pin so-called "stretch pin". No particular limitations are imposed upon the size of the stretch pin which is thus selected depending upon the thickness, width and kind of a drawn article to be produced. For Example, if an object to be drawn is less than 0.5 mm in thickness, the diameter of the stretch pin is in the range of 0.5–30 mm, preferably 1–2 mm. The length of the stretch pin in the transverse direction is also suitably selected but is usually in the range of 10–50 cm. Furthermore, if an object to be drawn exceeds 0.5 mm in thickness, the size of the pin is selected suitably as well.

The range of length to be drawn is also not particularly restricted as long as the achievement of the object of the invention is not disturbed and thus it can be selected suitably depending upon the thickness, width and kind of a drawn article to be produced. For instance, in the case where an object to be drawn is less than 0.5 mm in thickness, the length thereof (the length in the drawing direction) is usually in the range of 0.5 to 5 mm. If an object to be drawn is over 0.5 mm in thickness, the length thereof is usually in the range of 0.5 to 10 mm.

The deformation ratio of an article by the above-mentioned drawing can be selected from a wide range in which lower limit is 1.5-fold, preferably 3-fold if expressed by drawing ratio (the length of an article after being drawn/ the length of the article before being drawn) and upper limit is not particularly restricted as long as the article is not broken by drawing force but usually on the order of 150-fold, preferably in the range of 5 to 20-folds.

Drawing speed is not particularly restricted and is thus selective suitably depending upon the molecular weight, molecular weight distribution of a fluoroplastic, drawing ratio by tensile stretching and the shape of a molded fluoroplastic prior to be drawn by tensile stretching. If employing a batch stretch-drawing method, the lower limit of drawing speed (for example the speed of the crosshead of a tensile tester) is usually 1 mm/minute, preferably 5 mm/minute while the upper limit is usually 500 mm/minute, preferably 100 mm/minute. If employing a continuous drawing method, the upper limit of the peripheral speed of a take-up roller is usually 10 mm/minute, preferably 50 mm/minute while the upper limit is usually 500 m/minute, preferably 300 m/minute, more preferably 100 m/minute.

If an extruded or rolled article is used as a fluoroplastic molded article, the molded article may be drawn with width as it is but may be slitted into a certain width in the range of 0.5 to 150 mm, preferably 1 to 100 mm, more preferably 1 to 50 mm.

The drawing according to the invention may be done by a two or more-stage.

In the inventive process, if desired, a conventional tensile stretching process may be additionally applied after and before conducting the drawing processes according to the invention.

This conventional tensile stretching should be effected at the above-mentioned temperature at which a fluoroplastic does not substantially melt. If the tensile stretching is effected by using a heat medium, it should also be heated to the above-mentioned temperature at which a fluoroplastic does not substantially melt. More specifically, the conventional tensile stretching should be carried out below a temperature of the upper limit solid-state molding temperature which has already been defined with respect to the above-mentioned solid-state molding processes. When polytetrafluoroethylene is subjected to the conventional tensile stretching, the upper limit stretching temperature is the temperature at which polytetrafluoroplastic does not substantially melt, preferably less than 335° C., more preferably less than 320° C., further preferably less than 300° C. and the lower limit is above room temperature, preferably above 40° C.

As the tensile stretching at this stage, there may be used a batch method in which an article to be tensile stretched such as an extruded or rolled article is tensile stretched in an isothermal bath using a tensile tester or a method in which the stretching is continuously effected such as stretching using a nip or a heated plate, zone stretching and hot air stretching. If the continuously effected stretching method is employed, the stretching may be conducted by using heat rollers or by high frequency heating, microwave heating, infrared or far infrared heating or hot air heating. These may be used singular or in combination.

The deformation ratio of an article resulting from the foregoing tensile stretching can be selected from a wide range, preferably the range of 1.1- to 10-fold, preferably 2- to 5-fold by tensile stretch ratio (the length of an article after being stretched/the length of the article before being stretched).

Tensile stretch speed is not particularly restricted and is selective suitably depending upon the molecular weight, molecular weight distribution of a fluoroplastic, tensile stretch ratio and the shape of a fluoroplastic prior to be tensile stretched. If employing a batch stretch-drawing method, the lower limit of drawing speed (for example the speed of the crosshead of a tensile tester) is usually 1 mm/minute, preferably 5 mm/minute, while the upper limit is usually 500 mm/minute, preferably 100 mm/minute. If employing a continuous tensile stretching method, the lower limit of the peripheral speed of a take-up roller is usually 10 mm/minute, preferably 50 mm/minute while the upper limit is usually 500 m/minute, preferably 300 m/minute, more preferably 100 m/minute.

If an extruded or rolled article is used as a fluoroplastic molded article, the molded article may be tensile stretched with width as it is but may be slitted into a certain width in the range of 0.5 to 150 mm, preferably 1 to 100 mm, more preferably 1 to 50 mm before being tensile stretched.

This conventional tensile stretch may be done by a two or more-stage.

The drawn molded article of a fluoroplastic thus obtained in accordance with the inventive drawing process may be in the shape of a fiber, a tape and a film and may have a cross section in the shape of an ellipse or a rectangle.

The drawn molded article in the shape of a tape or a film may be applied to a split treatment which makes mechanical cuts extending in the drawing direction so that the molded article can take the form like a net when it is spread transversely. Alternatively, after the tensile stretching process, the resulting molded article may be applied to a heat treatment when it is under the state of tension or relaxation at a temperature within the range of the temperatures at which it does not substantially melt.

In the present invention, it is desired to increase the draw ratio or the total draw ratio if the final molded article is obtained by passing through an additional molding process such as extrusion or rolling, as high as possible because the final molded article can be imparted with high strength and tensile modulus. The total draw ratio can be determined by the product of deformation ratio in each molding process, more specifically extrusion ratio×draw ratio, rolling efficiency×draw ratio, extrusion ratio×draw ratio×tensile stretch ratio or rolling efficiency×draw ratio×tensile stretch ratio. More specifically, the total draw ratio is selected from the range between 25- and 250-fold, preferably 30- and 200-fold, more preferably 100- and 160-fold.

According to the present invention, there can be produced a molded article having tensile strength and tensile modulus both of which are considerably higher than those obtained by conventional methods. For instance, with the use of polytetrafluoroethylene as a starting fluoroplastic, there can be obtained the drawn molded article having tensile strength exceeding 800 MPa, preferably 1 GPa and tensile modulus exceeding 100 GPa, preferably 120 GPa.

The present invention will now be described by way of the following examples which should be regarded as illustrative. A static melting point was measured in accordance with the following method.

[Method For Measuring A Static Melting Point]

A starting fluoroplastic was weighed 1 mg before and after being subjected to each molding processes. The melting endothermic curve was drawn for the fluoroplastic at every time it was weighed by using a differential scanning calorimeter (DSC-220 manufactured by Seiko Electronics Kogyo Co., Ltd. hereinafter referred to as DSC) under the conditions that heating rate was 10° C./minute. The temperature indicated by the maximum endothermic peak of the curve was taken to be the static melting point.

EXAMPLE 1

6 grams-weighed polytetrafluoroethylene powder (PTFE, 6-J manufactured by Mitsui Dupont Floro Chemical Co.) having a molecular weight of $5.0\times10^6$ and a melting point of 327° C. were nipped between a pair of disc-shape steel plates having a diameter of 100 mm and preheated at a temperature of 325° C. which is below the melting point for 10 minutes, followed by compression molding at a pressure of 12 MPa. The powder was cooled down to room temperature while being pressurized thereby obtaining a film having a thickness of 0.5 mm and a diameter of 90 mm. The static melting point of the film thus obtained was measured using DSC and revealed to be 335° C. The film was cut to be in the form of a strip and then nipped into billets made from another polytetrafluoroethylene, followed by solid-state co-extrusion at a temperature of 330° C. The strip was extruded 12-fold in the longitudinal direction and found to be aesthetic in visual appearance. The sample nipped into the billets was taken out therefrom thereby obtaining a tape-like extrudate. The resulting extrudate was measured for static melting point using DSC and revealed to be 337° C. The extrudate was then fed at a speed of 1 cm/minute to a stretch pin having a diameter of 15 mmφ, a surface temperature of 370° C. and a contact length with the extrudate in the feed direction of 2 mm and taken up at a speed of 12 cm/minute so as to be drawn 12-fold, thereby obtaining a drawn article of 144-fold in total draw ratio. The drawn article was measured for static melting point using DSC and revealed to be 342° C.

The drawn article was 800 MPa and 100 GPa in tensile strength and tensile modulus at a temperature of 24° C., respectively.

EXAMPLE 2

The procedure of example 1 was followed except that the extrusion ratio was 20-fold.

The 20-fold extrusion was succeeded thereby obtaining an extrudate which is aesthetic in visual appearance. The resulting extrudate was measured for static melting point using DSC and revealed to be 338° C. The extrudate was then fed at a speed of 6 cm/minute to a stretch pin having a diameter of 15 mmφ, a surface temperature of 370° C. and a contact length with the extrudate in the feed direction of 2 mm and taken up at a speed of 30 cm/minute so as to be drawn 5-fold, thereby obtaining a drawn article of 100-fold in total draw ratio. The drawn article was measured in static melting point using DSC and revealed to be 341° C.

The drawn article was 740 MPa and 78 GPa in tensile strength and tensile modulus at a temperature of 24° C., respectively.

COMPARATIVE EXAMPLE 1

The extrudate obtained by Example 2 (the static melting point thereof was 338° C.) was cut to be about 5 cm in length and drawn using a tensile tester equipped with a temperature controlled bath of which temperature was 330° C. and a pair of clamps which are separated 25 mm before drawing, at a stretching speed of 25 mm/minute. The tensile stretching was achieved up to 1.9-fold thereby obtaining a drawing article of 38-fold in total draw ratio.

The drawn article was 337° C. and 740 MPa and 78 GPa in tensile strength and tensile modulus at a temperature of 24° C., respectively.

COMPARATIVE EXAMPLE 2

The extrudate obtained by Example 2 (the static melting point thereof was 338° C.) was cut to be about 5 cm in length and drawn using a tensile tester equipped with a temperature controlled bath of which temperature was 120° C. and a pair of clamps which are separated 25 mm before drawing, at a stretching speed of 25 mm/minute. The tensile stretching was achieved up to 3.5-fold thereby obtaining a drawing article of 70-fold in total draw ratio.

The drawn article was 455 MPa and 77 GPa in tensile strength and tensile modulus at a temperature of 24° C., respectively.

The fluoroplastic molded article produced in accordance with the present invention is a fluoroplastic material having increased strength and tensile modulus both of which could not be obtained by conventional methods, while maintaining resistance to heat and chemicals which are equivalent to those of conventional fluoroplastics. The inventive process can be carried out more economically than conventional methods and is capable of supplying the fluoroplastic at a price meeting the commercial needs. Furthermore, the fluoroplastic produced by the inventive process can be expected to be in use in a new plastic material field where high strength and tensile modulus are desired. Specifically the drawn article produced by the inventive process can be applied to usage for rope, a fishing net, a net for culturing a laver, a net used on land, a net for sports, a suture thread for medical use, a fishing line, a kite string, a reinforcing agent for cement, a woven fabric, a non-woven fabric, a sheeting, a variety of filters and a reinforcing agent for composite material. Therefore, the molded article is valuable when consideration give to its applicability not only for industrial fields of automobile, electric, petroleum, chemical, fisheries, engineering, construction, medical treatment but also for daily clothing and general merchandise.

What is claimed is:

1. A process for producing a drawn molded article of a fluoroplastic, comprising the steps of:
   (A) solid-state extruding or solid-state rolling said fluoroplastic at a temperature at which said fluoroplastic does not substantially melt at an extruding ratio of 2-fold to 100-fold or a rolling ratio of 1.2-fold to 30-fold;
   (B) bringing the molded article into contact with a heating medium set at a temperature exceeding a static melting point of said molded article; and
   (C) drawing said contacted molded article at a temperature at which said molded article does not substantially melt at an extension ratio of 3-fold to 150-fold, such that said fluoroplastic is extended at a total extruding or rolling ratio and drawing ratio of at least 100-fold.

2. The process according to claim 1 wherein said heating medium is a stretching pin.

3. The process according to claim 1 wherein said fluoroplastic is compression-molded at said temperature at which said fluoroplastic does not substantially melt before being extruded or rolled in a solid state.

4. The process according to claim 1 further comprising drawing said molded article by tensile stretching.

5. The process according to claim 1 further comprising conducting an additional tensile stretching step before or after said drawing of said molded article.

6. The process according to claim 1 wherein step (A) further comprises solid-state extruding or solid-state rolling said fluoroplastic at a temperature at which said fluoroplastic does not substantially melt at an extruding ratio of 5-fold to 60-fold or a rolling ratio of 1.5-fold to 20-fold; and step (C) further comprises drawing said contacted molded article at a temperature at which said molded article does not substantially melt at an extension ratio of 5-fold to 20-fold, such that said fluoroplastic is extended at a total extruding or rolling ratio and drawing ratio of 100-fold to 250-fold.

7. The process according to claim 1 wherein solid-state extruding is conducted by a co-extrusion method in which said fluoroplastic is extruded by being nipped between sheets or billets made from at least one plastic different from said fluoroplastic and selected from the group consisting of polyolefins and fluoroplastics different from said fluoroplastic.

8. A process for producing a drawn molded article of a fluoroplastic comprising the steps of:
   (D) solid-state extruding or solid-state rolling said fluoroplastic at a temperature which causes a static melting point of said molded article to be greater than a melting point of said fluoroplastic at an extruding ratio of 2-fold to 100-fold or a rolling ratio of 1.2-fold to 30-fold;
   (E) bringing the molded article into contact with a heating medium set at a temperature exceeding said static melting point of said molded article; and
   (F) drawing said contacted molded article until melting of said molded article begins to occur such that said molded article does not substantially melt at an extension ratio of 3-fold to 150-fold, such that said fluoroplastic is extended at a total extruding or rolling ratio and drawing ratio of at least 100-fold.

9. The process according to claim 8, wherein said temperature in step (D) causes said static melting point of said molded article to be different from said melting point of said fluoroplastic by at least 4° C.

\* \* \* \* \*